United States Patent [19]

Giardino et al.

[11] 4,223,484
[45] Sep. 23, 1980

[54] ELECTRONIC CONTROL DEVICE FOR GRINDING MACHINES, BASED ON THE EVALUATION OF TRUING DIAMOND POSITION RELATIVE TO WORKPIECE

[76] Inventors: Vittorio Giardino, Strada Maggiore 32, Bologna, Italy; Loris Giardino, Via G. Rossi, 4, Bologna, Italy

[21] Appl. No.: 958,436

[22] Filed: Nov. 7, 1978

Related U.S. Application Data

[63] Continuation-in-part of Ser. No. 771,972, Feb. 25, 1977, abandoned.

[30] Foreign Application Priority Data

Oct. 1, 1976 [IT] Italy .................................. 3549 A/76

[51] Int. Cl.$^3$ ............................................. B24B 49/04
[52] U.S. Cl. ................................. 51/165.77; 51/165.87; 51/165.93
[58] Field of Search ............. 51/165 R, 165.91, 165.93, 51/165.77, 165.87

[56] References Cited

U.S. PATENT DOCUMENTS

| | | | |
|---|---|---|---|
| 3,774,349 | 11/1973 | Uhtenwoldt | 51/165.93 |
| 3,842,545 | 10/1974 | Possati | 51/165.91 |
| 3,898,440 | 8/1975 | Fukuma | 51/165.91 |
| 4,018,010 | 4/1977 | Pozzetti et al. | 51/165.91 |

*Primary Examiner*—Harold D. Whitehead
*Attorney, Agent, or Firm*—Browdy and Neimark

[57] ABSTRACT

An electronic control apparatus for internal grinders wherein, with the workpiece fitted on slippers, a hole diameter gauger is provided. The gauger consists of two symmetric, linear transducers, by which the positions of both ends of a diameter are separately sensed. A measuring instrument is provided along the axis of wheelhead unit feeds, referred to the diamond truing position. The above defined electronic, control apparatus includes means by which the displacements of rotation axis from one, to another workpiece, caused by the changes in the diameter of same piece, are obtained from the signals of the two linear transducers. An analogic inverter, by which the sign of signal of one of the transducers is reversed, and an analogic adder, in which said reversed sign signal and the signal of other transducer are added with one another are provided. Means are provided for deriving the position of truing diamond relative to workpiece (considered along the axis of feeds), from the gaugings of hole diameter, from the traversings of grinding wheel, and from the traversings of workpiece rotation axis. Means are included for the utilization of results of the measurements and of the position, for controlling the operating cycle. When the workpiece is not fitted on slippers, the means as herein before stated, for deriving the displacements of rotation axis from one, to another workpiece, caused by the changes in the O.D. of same piece, from the signals of the two linear transducers, are not included in the electronic control apparatus.

6 Claims, 20 Drawing Figures

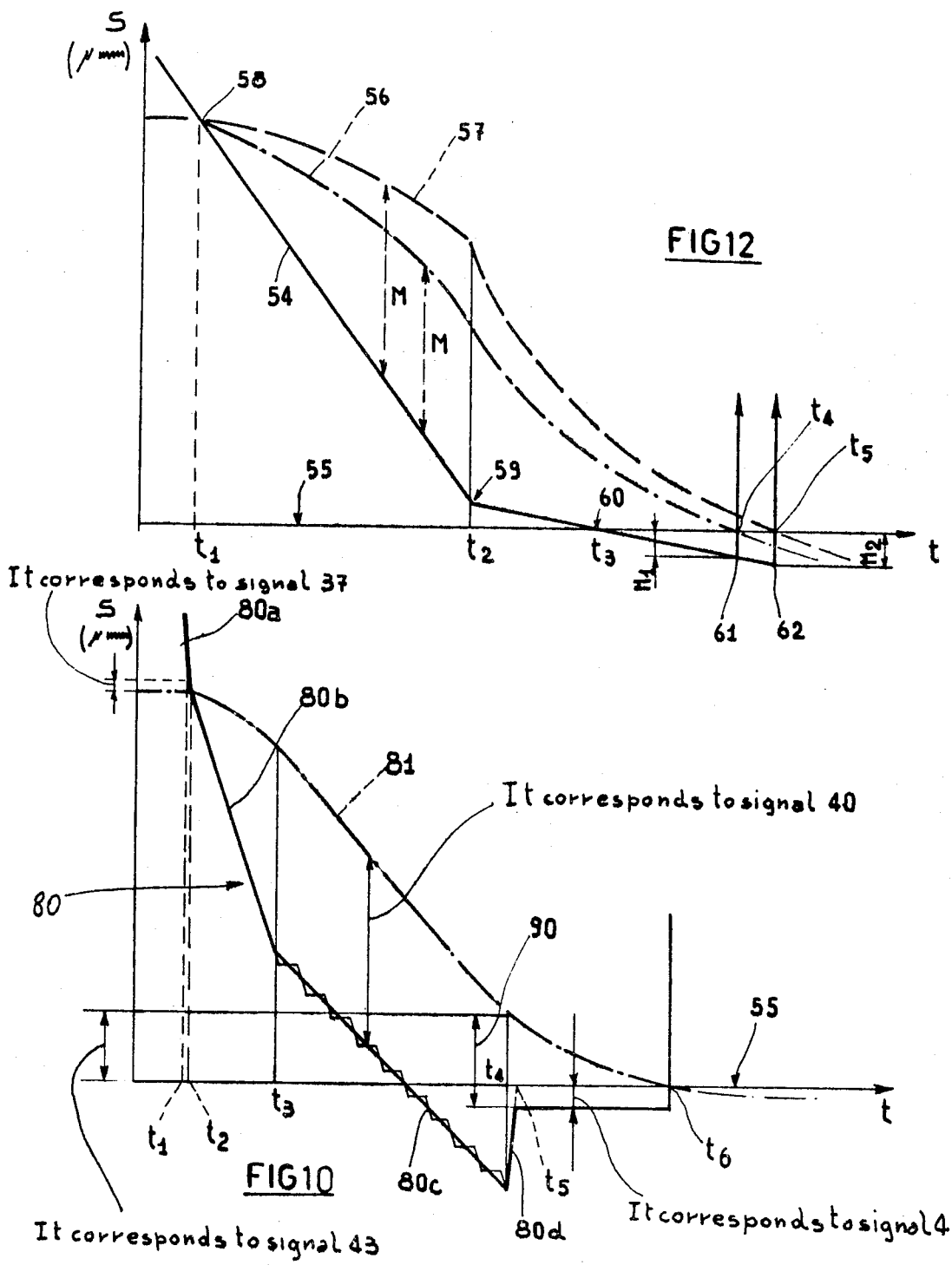

ELECTRONIC CONTROL DEVICE FOR GRINDING MACHINES, BASED ON THE EVALUATION OF TRUING DIAMOND POSITION RELATIVE TO WORKPIECE

CROSS REFERENCE TO RELATED APPLICATION

The present application is a continuation-in-part of U.S. application Ser. No. 771,972 filed Feb. 25, 1977, now abandoned.

BACKGROUND OF THE INVENTION

As well known, in a grinding machine, the wheel is cyclically dressed, with simultaneous restoring of its shape by the so called diamond truing; the position of cutting surface of inoperative grinding wheel, relative to machine is determined by the position of diamond and by the traverses of wheelhead unit.

The surface which is being ground is identified by its rotation axis and by the diameter, and in the course of grinding operation, it is tangent to wheel cutting surface; however, the position of operating wheel differs from that which would be taken by the inoperative wheel, due to the presence of substantial elastic deformations, caused by the pressure of wheel against the workpiece, and that are usually, though improperly called "extension flexure" (which is actually a part only of such deformations).

With the method based on the grinding wheel control ("size-matic"), the gauging of hole depends on the reproducibility of hereinafter stated factors: (a) The position of truing diamond relative to workpiece; (b) The traverses of wheelhead unit; (c) The final extension flexure; (d) The wear of grinding wheel from the last diamond truing and the end of grinding operation. A periodic control of workpieces, with possible corrections, is required by the point (a), due to the action of slow drifts, caused by the wear and by thermic motions while, when the workpiece is fitted on slippers, the method becomes quite inapplicable, since any difference in the outer diameter should directly be reflected on the diameter of hole. The point (b) may be considered as complied with in the properly designed machines. By the point (c), final flexures so small are required, that the variations thereof may be neglected, and thus very long times for the extinction of ray of sparks. By the point (d), a diamond truing is necessary before of finishing pass.

With the methods based on the workpiece control ("gage-matic"), the direct action of stated factors on the gauging of hole is prevented, without however preventing an indirect action thereof. As a matter of fact, the final extension flexure cannot be controlled by such methods, and since such flexure results in a misalignment of grinding wheel, with a consequent taper of hole (above all in short, shape-ground holes, or ground with a small oscillation only), it follows that the gauging of hole is indirectly influenced by the final extension flexure, through alterations of the shape. Moreover, all variations in the final extension flexure result in differences in the finish degree of ground surfaces.

Additionally, no indication that may be utilized for a better exploitation of machining time can be obtained from either methods as stated above.

SUMMARY OF THE INVENTION

The main purpose of the device according to the invention is to allow for a method of control that may be qualified as an overall procedure (since it is a simultaneous control both of workpiece and of grinding wheel), and in the range of which indications become available for the rapid feed or approach of wheel to workpiece, for the roughing under a constant pressure, the finishing under no feed and above all the attainment of final dimension with a well pre-established and constant extension flexure.

The device according to the invention involves, similarly to "gage-matic" systems, the presence in the grinder of an (electronic) hole diameter gauging device, by which no particular requirements are to be met, except in the case of grinders fitted with slippers where, due to reasons which will be itemized later on, the gauging device is to be of the type (which is besides widely adopted) where the positions of the two ends of a diameter are separately sensed by two linear transducers having an equal sensitivity.

Moreover, the device according to the invention involves the presence in the grinder of a device by which the traverses of wheelhead unit are measured, being such traverses considered along the axis of feeds and referred to wheel truing position, i.e. such that they be, or that can be simultaneously made equal to zero at each wheel diamond truing operation. Thus e.g., in the grinders with cam-feed, where the wheel wear is compensated by other mechanisms, and thus the cam is returned in the same wheel truing position after each grinding cycle, a potentiometer firmly connected with the cam is sufficient for giving a signal having the required requisites.

Then, to prevent any ambiguity of signs of considered measurements, it is assumed that the gauging of hole diameter be negative for diameter smaller than the nominal size, and that the measurement of grinding wheel traverses be increasing for traverses by which the wheel is approached to workpiece. Conversely, the sign is properly reversed by an analogic inverter.

One can now consider a signal by which the traverse of grinding wheel is measured, but which is referred instead of to a diamond truing position, to a position in which the wheel would touch lightly a finished hole (i.e. ground to that diameter which is indicated as zero by the related measuring instrument). One can call such signal a measurement signal of position of a grinding wheel, related to a workpiece. When the weheel is brought to touch lightly a hole having a different diameter, then such signal has a sensitivity double than that of diameter measuring device, and provided that the workpiece is turning about the same axis, will take a value equal to that indicated by the diameter measuring device.

The exception concerning the rotation axis may get rid of, when the possibility axists to evaluate (as stated later on) the amount of shiftings of the same axis from one, to the next workpiece, considered in the direction of feeds, and incressing for shiftings by which the same axis is drawn away from the diamond.

In the device according to the invention, the measurement of wheel position, referred to a workpiece, is obtained at the output from an analogic adder, wherein the sum is formed of signal coming from device by which the wheel traverses (referred to diamond truing position and with a sensitivity double that of hole diameter gauging) are measured, and of a signal by which the displacements of workpiece rotation axis are measured (obviously when such displacements occur, i.e. typically when the workpiece is placed on slippers), as well as of a further signal, which can be denominated an equalizing signal, such as to make the total sum equal to hole diameter gauging, when the wheel is brought to lightly tough the workpiece.

Since in the diamond truing position a zero signal is given by the wheel shifting measuring device, the other two terms, when added with one another, represent the distance between the diamond and the workpiece (considered this latter in the point of tangency with the wheel at the end of grinding operation), i.e. just that parameter which determination is stated as fundamental in the considered device.

The evaluation of former term, i.e. of shifting of workpiece rotation axis, is to be performed for each workpiece, making use of particular feature as previously stated for the hole diameter gauger to be utilized in grinders fitted with slippers.

BRIEF DESCRIPTION OF THE DRAWINGS

FIG. 10 shows, in graphic form, a complete cycle for an internal grinder realized with the device in question.

FIG. 12 shows, in graphic form, the relation between forward motion of a carriage with respect to the nominal diameter for a hole.

DETAILED DESCRIPTION OF THE PREFERRED EMBODIMENTS

Before describing the embodiments of the present invention, a few brief remarks relating to the grinding art in general appear to be in order, reference being made to some of the above-mentioned figures.

Figure 1:
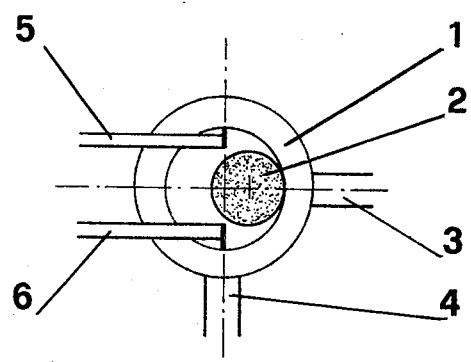
FIG. 1 shows, diagrammatically by way of an example, certain of the essential items which contribute to the grinding operation.

As shown in FIG. 1, the grinding wheel 2 cannot operate in any internal grinder without exerting a thrust F against the inner surface of the workpiece 1; a grinding wheel that glides over the surface being machined does not remove any material.

Figure 13:
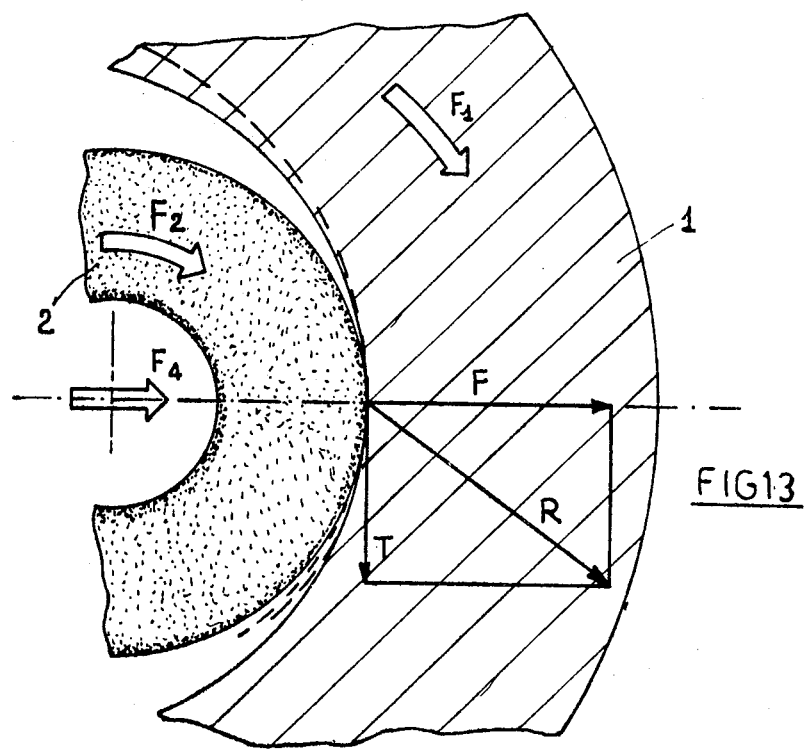
FIG. 13 pinpoints the thrust exerted by the grinding wheel on the workpiece.

The thrust F generates a tangential thrust T and thus the grinding wheel 2 is subjected to a force R resulting therefrom, which causes a flexure on the part of the wheel spindle P (see FIG. 13). The flexure, with the grinding wheel under stress (i.e. in operation) is never negligible in an internal grinder, despite the opposite being the case in an external grinder.

Figures 11A, 11B, 11C:
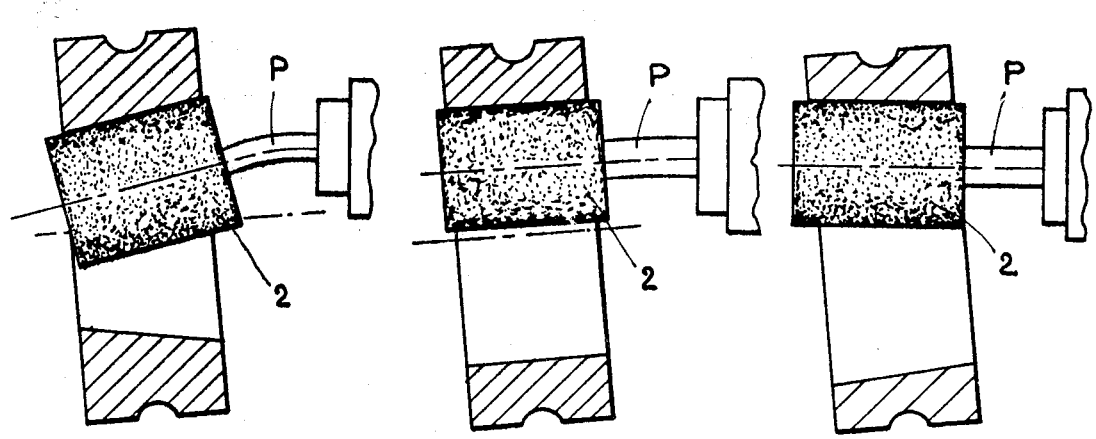
FIGS. 11a, 11b, and 11c are side views, partially in section illustrating the effects of spindle flexure.

The flexure of the spindle P discplaces the axis of the grinding wheel with respect to the configuration this would adopt when the grinding wheel is not subjected to stress (i.e. when it is not in operation) (see FIGS. 11a, b and c). It thus ensues that the hole made is conical (FIG. 11a) unless the axis of the workpiece 1 is displaced in such a way as to render it parallel with that of the grinding wheel (FIG. 11b).

Since the error elimination (taper) is only applicable for one single value of the spindle P flexure (FIGS. 11a, b, and c), the problem is, therefore, placed of attaining the nominal dimension of the hole with a flexure that is limited to a value compatible with the taper tolerance with respect to the corresponding cylindrical hole.

Figure 5:
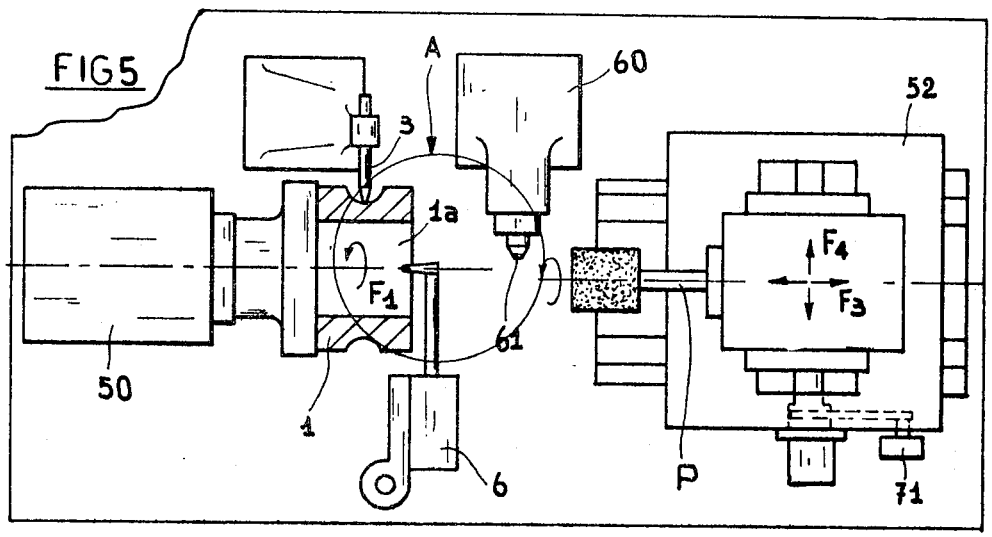
FIG. 5 shows, diagrammatically from above, an internal grinder.
Figure 7:
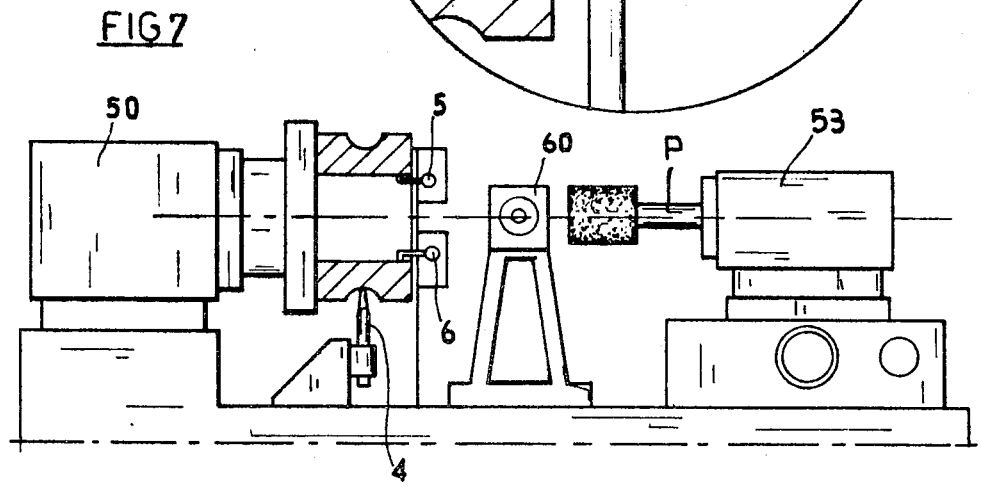
FIG. 7 shows, in a diagrammatic lateral view, the grinder depicted in FIG. 5.
Figures 8A, 8B:
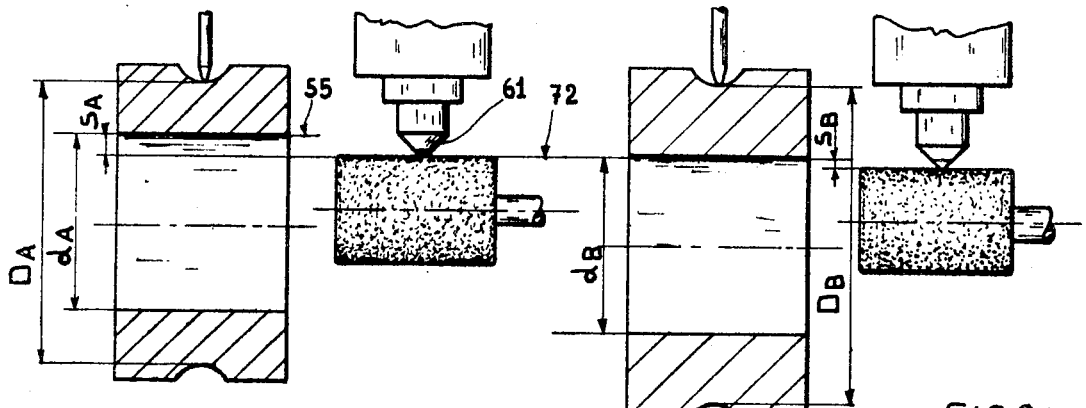
FIGS. 8a and 8b show the displacement of the axis of rotation of a workpiece mounted on shoes, with the consequent displacement of the zero line of the surface of the finished hole.
Figures 9A, 9B:
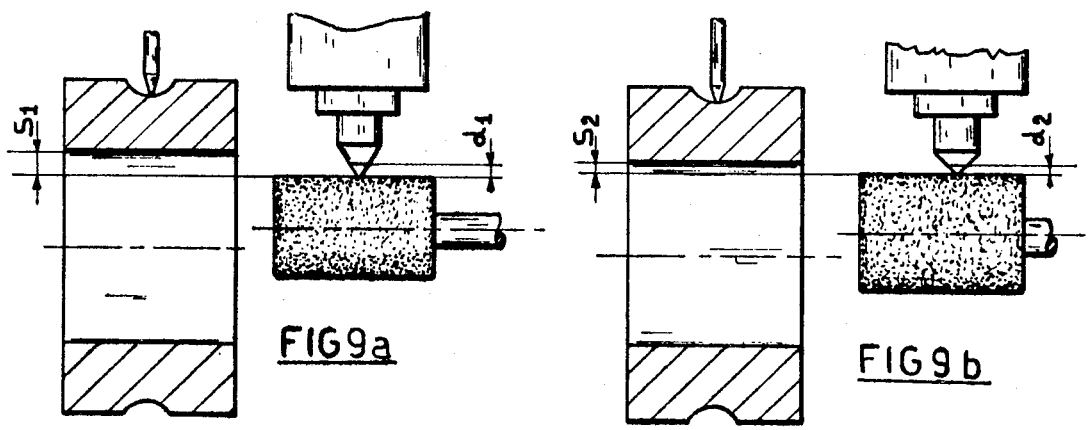
FIGS. 9a and 9b show clearly the displacement of the zero line of the surface of the finished hole consequential to the wear of the diamond.

In FIGS. 5 and 7, in a diagrammatic view seen in the former from above, and laterally in the latter, the essential parts of an internal grinder are shown.

The workpiece 1, provided with the hole 1a that it is intended to grind, is mounted on the shoes 3 and 4 and these are generally placed at 90° from one another. The workpiece 1 is placed in rotation (arrow $F_1$) through a motor 50 of known type.

The measurement of the diameter of the hole 1a is achieved by means of electrical signals 7 and 8 from two transducers 5 and 6 of known type. The signals 7 and 8 flow together into a summation device 51 whose output signal is the measurement of the diameter of the hole. Once the diameter of the hole 1a reaches its nominal value, the signal 9 equals zero, and this is customary with internal grinders.

At 60 the support is shown for the diamond 61 used to sharpen the wheel (diamond truing) after each grinding operation.

At 52 there is a carriage supporting a motor 53 with which to place in rotation (arrow $F_2$) the spindle P. The carriage 52 is movable longitudinally (arrow $F_3$) and transversely (arrow $F_4$). The longitudinal forward motion of the carriage is achieved with the use of means that are not shown because they are known; the transverse motion in the direction of the wheel 2 over the surface being machined of the hole 1a is subjected to the signal 9 and it ceases once the nominal value of the hole 1a is reached, i.e. with a signal 9 that is nil for the reason stated above. The said nil signal 9 is consequential to the reaching of the nominal value in the diametrical section defined by the transducers 5 and 6, and this is independent of the taper value of the hole, i.e. of the elastic strain of the wheel spindle.

In order to limit, upon the nominal dimension being reached, the said elastic strain of the wheel spindle within a pre-established tolerance range, the nominal dimension is approached in the known art at one and the same infeed speed, relying on the repeatability of the ratios between the infeed speed, the removal speed and the elastic strain of the wheel spindle.

A considerable proportionability between the speed at which the shavings are removed and the elastic strain of the wheel spindle, however, the proportionality coefficient, a function of numerous factors, is very much lacking in constancy and thus it is difficult to be able to state that under normal working conditions, the elastic strain of the wheel spindle is kept, at equal removal speeds, within an uncertainty band that is less than 30% of the mean value.

In order to keep the uncertainty band within acceptable values, the only thing that can be done is to keep the mean value very low, i.e. to adopt a very low finishing speed. Furthermore, the removal speed is not the forward motion speed, and only from a long term viewpoint are they identical, since the removal speed is late in matching the forward motion speed and, after a sudden variation in the latter, the former (and thus also the flexure) only passes gradually, under the exponential law, to the new rated value.

Since it is unthinkable that all the matching can be done at the low finishing speed, there will be a very much higher roughing speed. To this will correspond a very much wider flexure dispersion band which will only gradually reduce during finishing, thereby putting a minimum limit on the duration of the said finishing operation, if it is wished that the flexure uncertainty band is to approach values corresponding to the finishing speed.

The consequent necessity to effect the speed change very much in advance, and the low finishing speed, both contribute to lengthening the work cycle and constitute a problem in the conventional process which the apparatus according to the present invention effectively overcomes.

The foregoing is made clear in the graph in FIG. 12 where at 54 the forward motion is shown of the motor carriage 52 with respect to the line 55 which identifies the reaching of the nominal diameter for the hole 1a, i.e. the zero for the signal 9.

At 56 and 57 there are variations in the stock, with respect to the stated line 55, in relation to two grinding wheels with different removal speeds, as a function of different grinding wheel cutting capacities.

At 58, the grinding wheel glides over the hole 1a, instant t; subsequently the wheel presses on the surface being machined and thus, for the reasons stated above, the elastic strain of the wheel spindle shown with M in FIG. 12 is generated.

At 59, instant $t_2$, the change occurs from the roughing phase to the finishing phase. At 60, instant $t_3$, the grinding wheel passes the line 55 (or the zero line).

At 61 and 62, instants $t_4$ and $t_5$, respectively, the nominal value is reached of the diameter for the hole 1a with, in both cases, the elastic strain of the wheel spindle M1 and M2. With the arrival at the nominal value of the diameter, i.e. signal 9 nil, the transverse movement of the carriage 52 ceases.

In conclusion, the nominal dimension of the diameter is reached without any direct control of the elastic strain of the wheel spindle. It can be seen from the graph that the roughing (from the instant $t_1$ to the instant $t_2$) takes place with an elastic strain of the wheel spindle that is not constant, whereby it is necessary to bring about a change in speed very much in advance in order that the forward motion speed of the grinding wheel matches the removal speed prior to the nominal dimension of the diameter of the hole 1a being reached.

Finally, the forward motion of the motor carriage 52, not being in any way subjected to the elastic strain of the diameter of the hole 1a being reached without any direct check on the taper of the hole, the error in which (deviation in the conical hole made with respect to the ideal cylindrical hole) can be limited within a narrow tolerance field, decreasing the elastic strain charge (force R) that acts on the grinding wheel during the finishing phase, which would involve there being times unacceptable for the execution of a work cycle.

The electronic control apparatus of the present invention makes it possible to measure, fron one instant to another, the elastic strain of the wheel spindle during internal grinding operations and, furthermore, to control the various grinding cycle phases (the approach of the grinding wheel to the workpiece, the roughing and the finishing operations) to suit the elastic strain of the wheel spindle and to achieve, when the grinding has been completed, a hole with a predetermined taper.

The characteristics of the control apparatus are clearly shown on the accompanying drawings, to which further references are made below.

Reference is now made to FIG. 1, wherein 1 is the workpiece 2, is the grinding wheel, 3 and 4 are the workpiece supporting slippers positioned at 90° with respect to one another, as is used and 5 and 6 are sensors of a measuring instrument, located at respective ends of a vertical diameter of a hole. Now, because the transducers 5, 6 are symmetrically located in respect of a horizontal plane, it is manifest that the sum of separately produced signals, is equal to the length of the diameter, as referred to a nominal dimension whereon an initial zero setting was made; this is all that can be normally obtained by the measuring instrument. In the device according to the invention, besides utilizing the normal measurement of diameter, use is made of an analogic inverter for reversing the sign of lower transducer 6, and of an analogic adder for adding the signal of upper transducer to reversed signal, thereby obtaining the difference between the signals. Such difference is kept constant in the course of grinding operation, and obviously it corresponds to the double of vertical shifting of rotation axis, caused by changes in the O.D., in respect to a dimension established by the initial zero setting, in a position that may be considered, within limits, random however, without influencing in any way on the usefulness of signal). Obviously, owing to the position of slippers 3, 4, the shifting which is to be known—i.e. that along the axis of feeds—is equal to measured vertical shifting, having a double sensitivity, and which is increasing with the O.D., i.e. with the drawing of rotation axis away from the truing diamond, as required.

By the second component of distance truing diamond-workpiece, i.e. the equalizing signal, once the initial determination is made, only periodic controls and up-to-datings are required, since it is subjected to typically slow changes (see what previously stated as regard of point a), concerning the "size-matic" methods).

Both for the initial determination and for the subsequent periodic up-to-datings, in the device according to the invention is foreseen that the hole is ground by the wheel, which is then stopped for a cooling time sufficiently long as to ensure the practical undoing of extension flexure. The equalizing signal is delivered by a device which is apt to send an adjustable and memorizable signal, that at the end of cooling time, with the aid of a device wherein the measurement of grinding wheel position, referred to workpiece, is compared with the hole diameter gauging, makes the former equal to the latter one, by suitable modifying the outlet, and then keeping it unchanged until the next adjustment.

What hereinabove described, is illustrated in the schematic diagram of FIG. 2. Signals 7 and 8 form the symmetric linear transducers 5, which form a part of diameter gauging device, besides of being applied to an adder 47, which produces an output signal 9 corresponding to the gauging of hole diameter, are also applied, the signal 7 directly and the signal 8 through the analogic inverter 10, to an analogic adder 11, which produces an output signal 12 corresponding to the amount of shifting of workpiece rotation axis. A signal 13 is delivered by the wheel traverse measuring device 48, being such traverses referred to a diamond truing position. As previously stated, the signals 7, 8, 12 and the related units 10 and 11, may be lacking in grinders not fitted with slippers 7, whilst the signal 9, that directly comes from the diameter gauging device, is always present. A signal source 14 is a device by which an adjustable and memorizable signal is delivered, while 15 is the delivered equalizing signal delivered. The (possibly present) signal 12, and the signals 13 and 15, are applied to an analogic adder 16, which produces an output signal 17 (i.e. the measurement of grinding wheel position, referred to workpiece). In an analogic comparator 18, the signal 17 is compared with a suitable pre-established value signal 19, and when the former is greater than the latter, with the consent of a logic unit 20, by which the presence of suitable pre-established conditions is ascertained, the wheel feed is stopped by a signal 21 from the logic unit 20, while simultaneously a timer 22, set for a time period sufficient for the practical undoing of extension flexure, is started. The signal 17 is compared with the signal 9 in comparator 23, by which an indication of such comparison is delivered; on the basis of such indication, at the end of cooling time, as signalled by the timer 22, the signal 15 is produced by the signal source 14 in such a manner as to make the signal 17 equal to the signal 9, keeping then the signal 15 unchanged till to next adjustment.

Figure 2B:
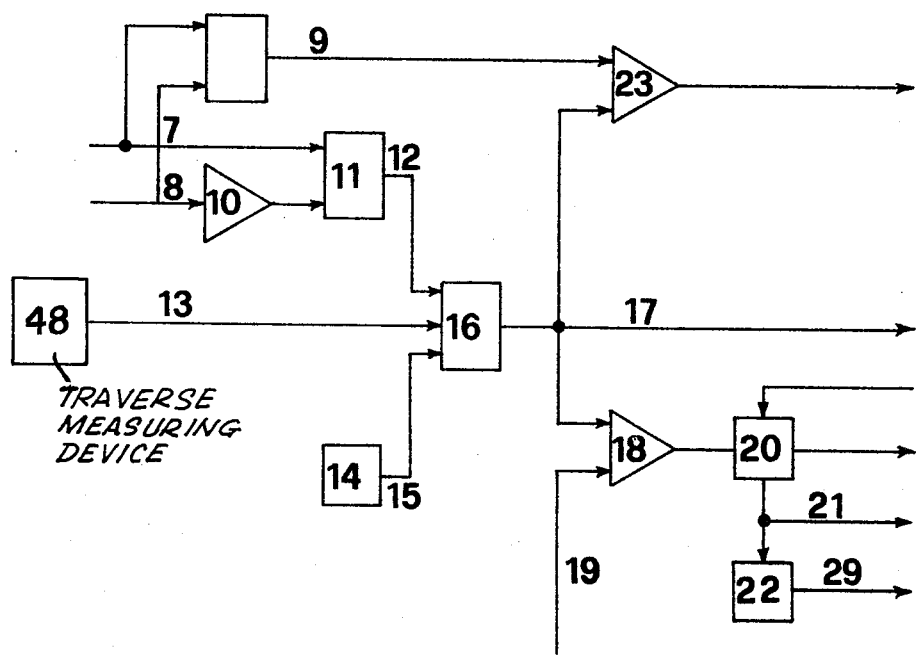
FIG. 2b shows, in a partial block giagram, the control apparatus in question related to an internal grinder in which the workpiece is mounted in shoes.

A particularly simple embodiment form as shown in the FIG. 2b is obtained when the logical unit 20 merely consists of a switch, by means of which the operator causes, when deemed expedient, the stopping of wheel feed by action of the comparator 18. The comparator 23 is a device with the zero indication. An optical indication of of time expiration is given by the timer 22, while the signal source 14 consists of a potentiometer manually operated by the operator, which thereby sets to zero the indication of the instrument at the expiration of time.

The preferred embodiment form is obviously wholly automatized. The logical unit 20 may be controlled by a counter of finished pieces, whereby to operate after each pre-established number of pieces, or it may be called in at each replacement of wheel, or even by any other cyclic criterion which may be deemed the most convenient. The signal source 14 consists (see FIG. 3) of a clock 24 that, via a logic unit 25, is in communication with the counting inlet 27 of a bidirectional counter 26. In same counter 26, the control inlet of counting direction if provided by an output signal 28 from the comparator 23, which consists of an analogic comparator; the same signal 28 is applied to the logic unit 25, to which also an output signal 29 from the timer 22 is also applied. Finally, the number in the counter 26 is converted, in the digital-analogic converter 30 into the equalizing signal 15. The mode of operation is as follows: the logic unit 25 is permitted by the signal 29 of timer, at the expiration of the set time, to start the counting, being the direction of counting predisposed by the level of the signal 28, which depends on the signal 17 being either greater, or smaller than the signal 9 in a sense such as to cause the signal 17 to tend to be equal to the value of the signal 9; the change in the level of the same signal 28 then causes via the logic unit 25 the discontinuation of counting.

Figure 2A:
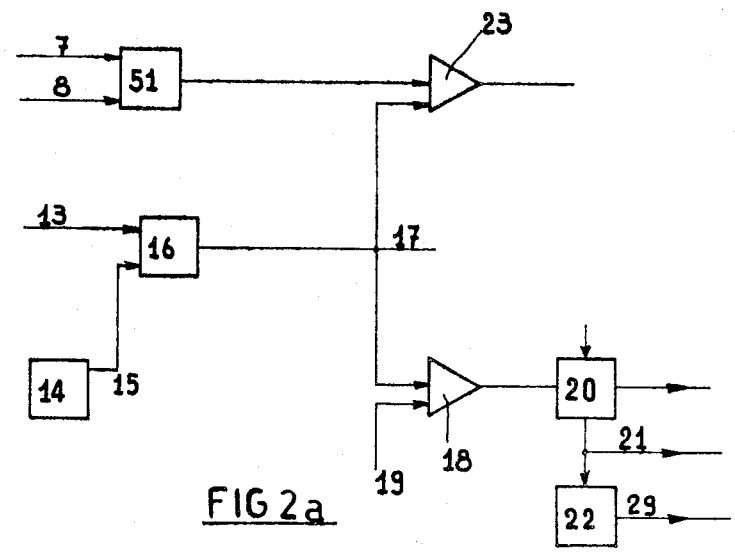
FIG. 2a shows, in a partial block diagram, the control apparatus in question related to an internal grinder in which the workpiece is not mounted on shoes.

Further realizations are technically possible but obviously, as far as they remain within the limits of the arrangements as shown in the FIGS. 2a and 2b forming part of this disclosure; they are to be viewed as variants of the same operating conception.

Figure 3:
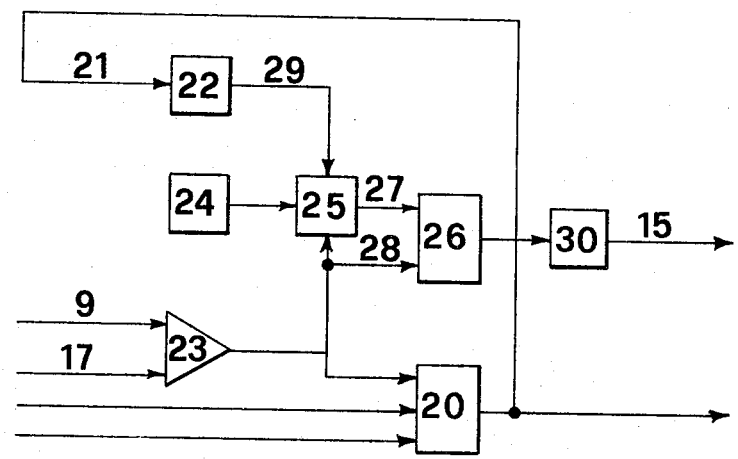
FIG. 3 shows, in a block diagram, the control apparatus in question set up to provide a matching signal.

By the embodiment illustrated in the FIG. 3, also the initial determination of equalizing signal can be automatically performed, since it requires a simple sequence of procedures, all similar to basic procedure.

The signal source 14 is initially set up in such a manner that the signal 15 corresponds to a distance between the truing diamond and the workpiece certainly smaller than the actual one (in the practice, the signal source 14 is located at the end of the adjustment range where the signal 17 is closest to zero); then, a first feed is imparted to the grinding wheel, such that a value 19 is attained by the signal 17; however, the wheel will attain a position in arrears than than which it should have attained if the equalizing signal would already have its correct value; consequently the signal 9, i.e. the gauging of diameter, will be at the expiration of cooling time, more remote from the zero than the signal 17 (if the wheel is not even into contact with the workpiece, the signal 9 will remain at its initial value) and the adjustment of the signal 15 will occur in the sense of moving the signal 17 away from zero. Then, by making a further feed in a similar way, the grinding wheel will take a more advanced position, and the procedure is repeated as many times as required in order that the signal 9 be, at the expiration of cooling time, no more far from zero than the signal 17; by the latter correction, the correct value will be attained by the signal 15.

The indication of end of procedure is obtained by the comparison signal is delivered by the comparator 23 which will deliver, at the expiration of the cooling period, a signal 17 that for the first time is not smaller than the signal 9. In the embodiment form as shown in the FIGS. 2 and 3, the process is stopped by the signal 28, when applied to logic unit 20.

Obviously, the device according to the invention aims to the utilization of obtained signals for the best guidance of machining cycle. Utilized for such a purpose are (see FIG. 4): the signal 9 (gauging of hole diameter), the signal 17 (position of grinding wheel in respect of workpiece), and a new signal 32, obtained by the analogic adder 33 wherein the sum is made of the signal 17 and of the signal 9, which sign is reversed by the analogic inverter 34. The signal 32 is a measurement of extension flexure. Indeed, when neglecting, in a first approximation, the wear of grinding wheel in operation, then the positive values of signal 32 will correspond to the distance between the desired position of an inoperative wheel, and the actual position thereof, which is tangent to the hole, i.e. to extension flexure, while the negative values represent the distance between the wheel, now actually unloaded, and the hole surface.

The admissibility of introduced approximation by neglecting the wear of grinding wheel, can be better evaluated after the description of machining cycle.

By a device according to the invention, a signal 35 is delivered at the output of an analogic comparator 36, as a result of the signal 32 being compared with a pre-established value 37; by this signal 35 the (irreversible) passage from the maximum feeding speed of wheel to a lower speed, is caused, thus stopping the phase of rapid approaching of the wheel to the workpiece; the selection of value 37, allows one to have the wheel stopped at a lesser or greater distance from the workpiece, thus taking into account the possible irregularities of rough shaped piece, or even with a moderate amount of extension.

By same device, a signal 38 is delivered at the output of an analogic comparator 39, as a result of the signal 32 being compared with a pre-established (and positive) value 40; by this signal 38, the speed introduced by the signal 35 is adjusted in such a manner as to keep the signal 32 at a given value of about 40, for example, with modalities that depend on the feeding mechanisms of the grinder; in extreme cases by an on-off regulation, that results in an intermittent feeding. Thus, in the whole course of roughing step, that removal under constant pressure is obtained, by which the minimum machining time, consistent with the features of wheel, is obtained.

By the device in question, a signal 41 is also delivered at the outlet of a comparator 42, as a result of the signal 9 being compared with a pre-established value 43. By this signal 41, the roughing step is discontinued, leaving for the finishing step a really constant stock, because the roughed piece, besides of having a constant gauged diameter, also shows a constant taper, since it has been machined with a constant extension flexure.

After the roughing step, the wheel is diamond trued, or not, as the case may be according to the criteria set out below.

Finally, by the device according to the invention, a signal 44 is delivered at the output of a comparator 45, as a result of the signal 17 being compared with a pre-established positive value 46; owing to the level of the signal 44, the feed direction is established, whilst a change in the level of same signal results in a final stopping of feed. As a matter of fact, in the roughing step, by the grinding under a constant extension flexure, the wheel may be brought beyond the final position; thus, when no diamond truing, with the necessary backward motion of wheel, is performed after the roughing step, then the possibility exists that the last motion should be made backwardly.

The quick attainment of final position by the part of grinding wheel, results in a minimizing of finishing time, by equality of finish stock and of final extension flexure, while by the use of the signal 17 is ensured that, by the time in which the nominal diameter is attained, the flexure shall be equal to the pre-established value, less the wear of grinding wheel, to begin with the last diamond truing.

The wear of working wheel is reflected also on the signals 35 (end of quick traverse) and 38 (maximum extension flexure); however, the consequent effects may be regarded as wholly negligible from the viewpoint of function of such signals. As regard the stopping pf final feed, the following considerations hold: Actually influencing are not the wheel wears, but their changes from one to the next piece; when the irregularities of rough pieces, or the too much reduced diameter of wheel, or other causes, are such as to result in appreciable changes in the wear of a working wheel; the wheel shape is also a factor and thus, to prevent defective shapes of finished holes, recourse is to be made to adequate steps for decreasing such changes (diamond truing after the roughing step, replacement of wheel after its diameter is reduced below a safety limit, a.o.); thus, it can be stated that, due already to other reasons, not imputable to the requirements of device according to the invention, the operating cycle should be conducted under conditions wherein the change in the wheel wear, between the last diamond truing and the end of work, be negligible.

Obviously, an end grinding signal is also delivered by the device according to the invention, when the zero is attained by the hole diameter. The signals 41, 35, 38 and 44 from the respective comparators 42, 36, 39 and 45, as well as the stop feed signal 21 from the logic unit 20 (FIGS. 2a, 2b, 3) if desired are fed to a conventional controller 49 which controls the cycle of the grinding machine.

With reference to the figures, at 5 and 6 two symmetrical linear transducers are shown (these being arranged at the extremeties of a diameter), the signals 7 and 8 of which flow together to a summation device 51. The output signal 9 takes on a zero value when the diameter of the hole 1a being machined on the workpiece 1 reaches its nominal value, and a negative value for diameter values below the nominal value: the transducers 5 and 6, and the summation device 51 identify the diameter measurer.

Figure 6:
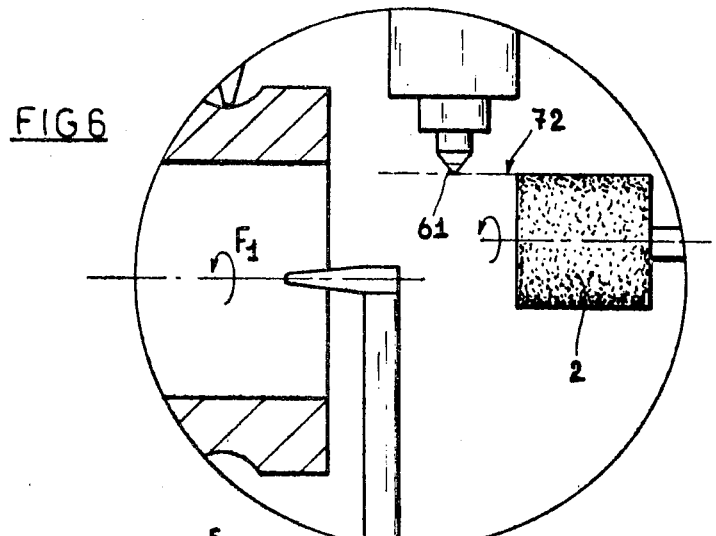
FIG. 6 shows, on an enlarged scale, the detail of FIG. 5.

Furthermore, a measurement device 71 (of known type) is also provided for grinding wheel displacements, and this automatically supplies a nil signal when the grinding wheel is being sharpened (line 72 in FIG. 6); the signal 13 supplied by the measurement device 71 is considered positive for displacements that cause the grinding wheel to approach the workpiece 1 and its sensitivity is twice that of the diameter measurer.

For an instant by instant evaluation of the elastic strain of the wheel spindle, there is a fundamental need to know the distance the grinding wheel would have to travel from the diamond truing position (line 72) to a position suitable for gliding over the finished workpiece.

The said parameter enables the edge of the diamond to be found (this identified the active surface of the grinding wheel) on an axis placed in accordance with the transverse motions of the wheel (arrow F4), originating on the surface of the finished workpiece at the tangent point with the grinding wheel (the stated line 55).

The electrical signal 17 corresponding to the parameter is achieved (first form of embodiment) on the output of a summation device 16 at the input of which are present the said signal 13 and a matching signal 15 supplied by a device 14. The said device 14 and the determination of the signal 15 will be described in due course.

The signal 17 measures the position of the active surface of the grinding wheel (line 92) with respect to the zero line 55 of the hole 1a (which corresponds to the nominal value of the diameter for the hole 1a). The signal 17 takes on a zero value when the surface of the grinding wheel reaches the said line 55. To achieve this, use is made of the signal 15 in such a way as to cancel the signal 17 under the aforementioned conditions.

During the sharpening of the grinding wheel using the diamond 61 (FIGS. 8a, 8b, 9a and 9b), also known as diamond truing, the signal 17 measures the position of the active surface of the grinding wheel, i.e. the edge of the diamond with respect to the zero line 55.

Since the signal 13 is equal to zero during diamond truing, the wear on the diamond due to a plurality of diamond truing operations performed, causes a variation in the diamond 61-zero line 55 position which is transferred in the signal 17. This is made clear in FIGS. 9a and 9b in which for $d_1 > d_2$ one obtains $s_1 > s_2$; the variation in the signal 17 is obtained through the signal 15, which, as will be explained in due course, is periodically updated.

In cases when the workpiece 1 is mounted on shoes 3 and 4, there is a deviation in the axis or rotation of the said workpiece as the outside diameter D varies. This brings about the displacement of the zero line 55, as is clearly shown in FIGS. 8a and 8b in which with $d_A = d_B$, for $D_A < D_B$ one gets $S_A > S_B$.

In order to take into account the displacement of the axis of rotation of the workpiece, which varies from one workpiece to another, provision is made for a second form of embodiment (FIG. 2b) for the device in question.

It is obvious from FIG. 2b that the signal 8, supplied by the transducer 6, is sent to an inverter 10. Since the signal 7 and the inverted signal 8 arrive at the summation device 11, the output signal 12 of this indicates twice the vertical displacement of the axis of rotation of the workpiece 1 due to variations in the outside diameter of the said workpiece.

In view of the position of the shoes 3 and 4 it is obvious that the displacement of the zero line 55 along the motion axis is equal to the measured vertical displacement (signal 12) which increases with the outside diameter of the workpiece, i.e. with the moving away of the axis of rotation of the diamond.

Again with the second form of embodiment, the signal 17 measures the position of the active surface of the grinding wheel (line 92) with respect to the zero line. The signal 17 is the sum of the signal 13, the signal 12 and the said signal 15 which, in its periodical determination, has to be of a value such as to cancel out the signal 17 when the line 92 coincides with the zero line 55.

Figure 14:
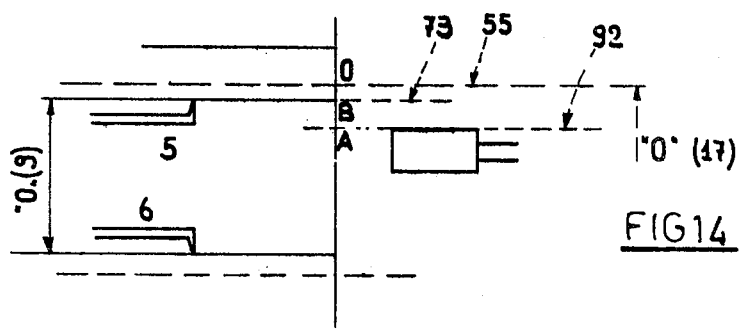
FIG. 14 shows, qualitatively, the zero line for signals shown in FIG. 2b.

To recapitulate the foregoing and with reference to FIG. 14, the signal 17 supplies the distance between the line 92 and the zero line 55 (segment OA), while the signal 9 supplies the measurement of the diameter of the hole, i.e. of the stock OB since the signal 9 cancels out as the segment OB is cancelled.

For the initial determination and for the periodical updating of the signal 15, the grinding wheel 2 is made to machine a hole 1a and is then suitably stopped for a sufficiently long spark-out time to ensure the elastic strain of the wheel spindle, taken as the difference between the signal 17 (segment OA in FIG. 14) and the signal 9 (segment OB in FIG. 14) being practically annulled.

In the aforementioned situation there is a perfect coincidence between the lines 92 and 73. To cause the zeroes of the signals 17 and 19 to coincide, use is made of the said signal 15 (stored by the device 14) so as to nullify the signal 32 (equal to the difference between the signal 17 and the signal 9) (after a complete spark-out) when the line 92 coincides with the line 73.

The way in which the matching signal 15 is updated is as follows:

The analogue comparator 18 compares the signal 17 with a suitable predetermined value 19, and when the former is greater than the latter, the signal 21, with the consent of the logical unit 20 which detects the occurrence of certain pre-established conditions, causes the grinding wheel forward motion to halt and, contemporaneously, sets in motion the timer 22, the adjustment of which is sufficient for the elastic strain of the wheel spindle to practically cancel itself out. The device 23 compares the signal 17 with the signal 9 and supplies an indication of the said comparison. Based on the said indication, once the spark-out time signalled by the timer 22 is over, the device 14 regulates the signal 15 so as to render the signal 17 identical to the signal 9, after which the signal 15 is left unchanged until it is subsequently adjusted.

A particularly simple way in which the diagrammatic form depicted in FIGS. 2a and 2b can be achieved is by having an ordinary switch for the logical unit 20, which the operator can manipulate when he deems the wheel motion should be stopped on the part of the comparator 18. The comparison device 23 is an instrument with zero indication. The timer 22 provides a visual indication of the expiry time, while the device 14 consists of a potentiometer operated manually by the operator to zero the indication of the instrument once the time has run out.

The preferred form of embodiment is naturally fully automatic.

The logical unit 20 can be controlled by a finished piece counter, so as to operate after a given number of pieces, or it can operate with each wheel change, or with some other cyclic criterion that may be considered more suitable. The device 14 consists of the clock 24 (see FIG. 3) which via the logical unit 25 communicates with the counting input 27 of the bidirectional counter 26. The counting direction control input in the said counter is actuated by the output 28 of the comparison device 23, which in this particular case consists of an analogue comparator. The said signal 28 goes into the logical unit 25 where it is joined by the output 29 of the timer 22. The digital-to-analogue converter 30 then converts the counter number into the matching signal 15. The mode of operation is as follows: when the time has expired, the output 29 of the timer 22 gives its consent to the logical unit 25 to commence counting in a direction preset by the level of the signal 28, this being dependent upon whether the signal 17 is greater than or less than the signal 9, in which the former is made to equalize the value of the latter. A change in the level of the said signal 28 causes in the logical unit 25 the counting to be ceased.

Other forms of embodiment are technically possible but it is clear that as long as they stay within the framework of the arrangement shown in FIGS. 2a and 2b as per the description given herein, they only constitute variants to one and the same functional concept.

In the form depicted in FIG. 3, the initial determination of the matching signal can also be effected in an automatic fashion requiring a simple succession of processes, all of which identical to the basic process.

The device 14 is initially set up so that the signal 15 corresponds to a diamond-workpiece distance certainly less than in reality (in practice the device 14 is placed at the end of the setting range, where the signal 17 is closest to zero). The grinding wheel then undergoes an initial movement such that the signal 17 adopts the value 19 but goes into a position further to the rear than would be the case if the matching signal were already at its right value. Consequently, the signal 9, i.e. the diameter measurement is, at the end of the spark-out time, farther from zero than the signal 17 (if the grindinw wheel where not to even touch the workpiece, then the signal 9 would stay at its initial value) and the regulation of the signal 15 would take place in order to move the signal 17 away from zero. When the grinding wheel is moved again, adopting the same procedure, it goes into a further forward position, and the process is repeated as many times as necessary for the signal 9 to be, when the spark-out is over, no further away from zero than the signal 17. Through this last correction, the signal 15 acquires its right value.

An indication that the process is over can be had from the comparison signal supplied by the device 23 which, for the first time, will give upon completion of the spark-out, a signal 17 that is not less than the signal 9. In the forms shown in FIGS. 2a, 2b and 3, the process is terminated by the arrival of the signal 28 at the logical unit 20.

Figure 4:
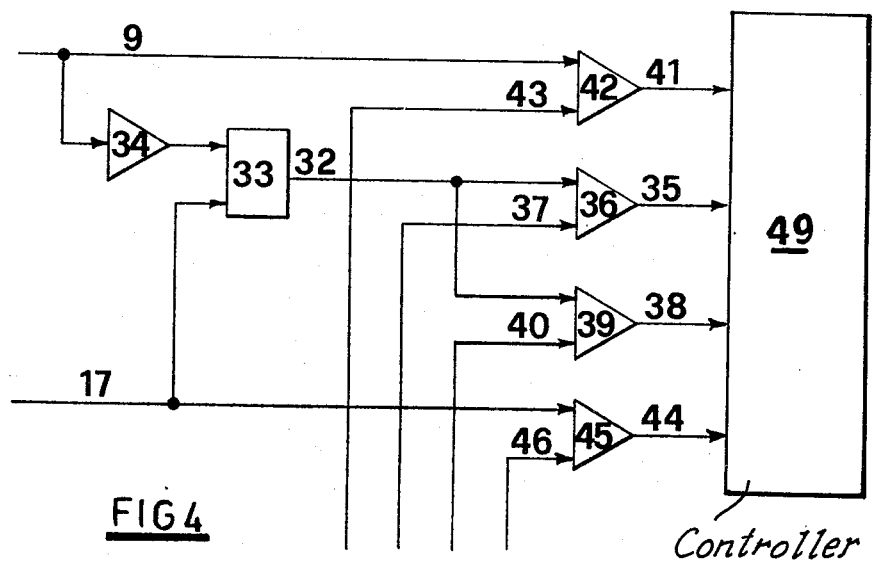
FIG. 4 shows, in a further partial block diagram, the apparatus in question.

A description will now be given of a machine cycle with particular reference to FIGS. 4, 10 and 14. In FIG. 10, the advancement of the grinding wheel carriage 52 is shown at 80, as a function of time, with respect to the zero line 55, and at 81, the stock variation as a function of time, referred to the zero line.

For the machine cycle condition use is made of the said signals 9 (segment OB) and 17 (segment OA), as well as signal 32 (OA–OB).

The positive signal 32 involves OA OB, i.e. the grinding wheel (line 92) not yet in contact with the workpiece 1 (surface of the hole 1a, line 73).

The signal 35 (put out by the comparator 36) controls the rapid approach of the grinding wheel to the surface of the hole 1a (line 73). The signal 35 is the difference between the signal 32 and a signal 37 ( O) (see FIGS. 4 and 10), which is selected in such a way as to operate the speed change (instant $t_1$) from the rapid approach speed (section 80a) to the work speed (section 80b) maintained at the commencement of roughing. In this way a too brusque an impact on the part of the grinding wheel against the surface of the hole 1a is prevented. The choice of the value 37 depends upon the irregularity of the unmachined surface (i.e. the initial surface of the hole 1a). The sign inversion of the signal 15 then operates the said change in speed.

As the grinding wheel carriage 52 continues to traverse (section 80a), the grinding wheel 2 glides over the surface of the hole 1a (instant $t_2$ corresponding to a nil signal 32) and, subsequently, due to the fact that the carriage 52 is moving, the grinding wheel 2 exerts a thrust R on the workpiece (FIG. 13) and thus the roughing phase commences.

The said thrust R causes a flexure of the shaft P that carries the grinding wheel and thus, consequently, the signal 32 becomes negative (OA OB, FIG. 14) since the line 92 is "forward" with respect to the line 73 which is tangential with the surface of the hole 1a being machined.

In the section 80b, the forward movement of the wheel is controlled by the signal 38. The speed at which the carriage moves stays constant until the elastic strain of the wheel spindle reaches a prefixed value 40. Signal 32 is applicable to the said elastic strain.

When the said condition occurs (signal 32=signal 40, instant $t_3$) and again through the signal 38, the carriage 52 carrying the grinding wheel is made to inch (a succession of stops and starts shown with broken lines 80c in FIG. 10), in such a way as to cause the roughing to proceed with a constant flexure load (resulting in force F in FIG. 13), i.e. with a constant elastic strain of the wheel spindle (signal 40).

To control when the roughing operation is to end, a comparator 42 is provided and this calculates the difference between the signal 9 and the signal 43, and when the resulting difference signal 41 is nil (instant $t_4$), the roughing phase ceases.

In addition to determining the end of the roughing operation, the signal 41 is used to cause the grinding wheel carriage to retract so as to position the active surface of the grinding wheel (line 92) with respect to the zero line 55; in fact instant $t_5$, the line 92 is "forward" with respect to the line 55 by a preset quantity corresponding to the signal 46.

At this juncture (instant $t_5$), the grinding wheel does not move forward (though it obviously continues to rotate) and it is the workpiece 1 that goes to zero through a partial spark-out. Once the diameter of the hole 1a reaches its nominal value (instant $t_6$ with the signal 9 equivalent to zero), the grinding of the hole 1a ceases and one can be certain that the signal 17 (supplying the elastic strain of the wheel spindle) is definitely equal to the signal 46. Thus the final nominal value of the hole 1a is obtained with a pre-established final elastic strain of the wheel spindle equivalent to the preset value 46.

The latter represents the final elastic strain of the wheel spindle achievable when the hole 1a reaches its nominal value, i.e. the zero line 55 (instant $t_6$), and it ensues that the grinding of the hole 1a is finalized at a preset elastic strain of the wheel spindle value, i.e. with the taper at a predetermined value.

Figure 15:
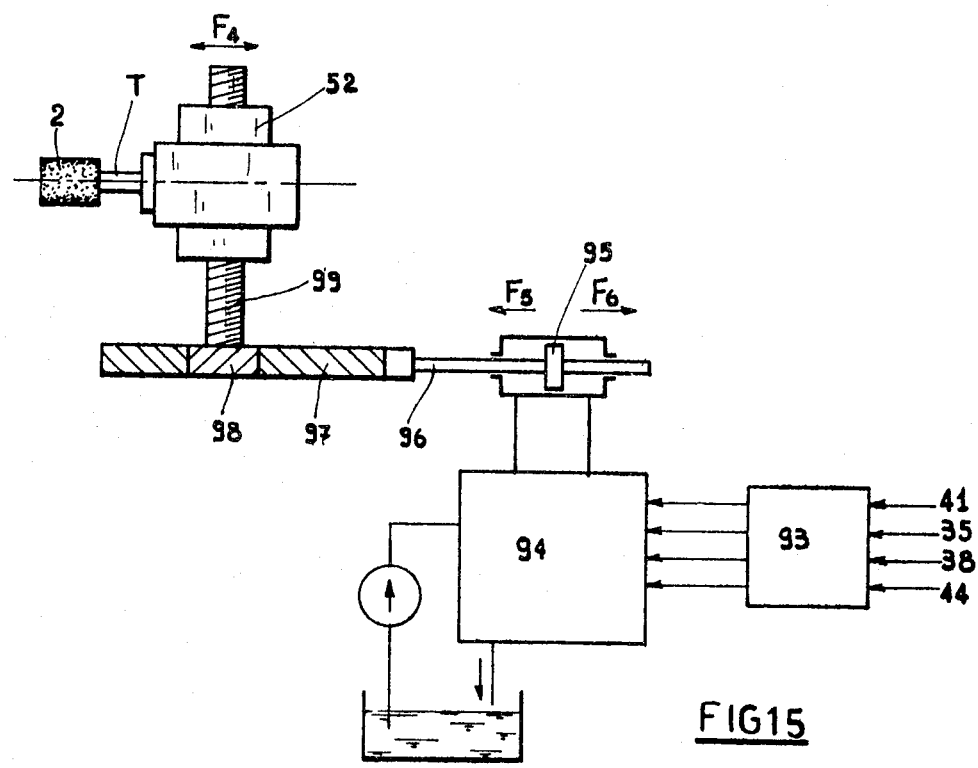
FIG. 15 shows, diagrammatically, the means provided for the transverse motion of the wheel spindle carriage.

By way of an example the case is shown in which the transversal forward motion (arrow F4) is achieved through the use of a hydraulic piston. The said signals 41, 35, 38 and 44 are amplified by an amplifier 93 of known type (FIG. 15) which controls a hydraulic circuit 94, also of known type.

The said hydraulic circuit 94 requires the displacement in one direction (arrow F5) or another (arrow F6) of a piston 95, the rod of which is connected to a rack that couples with a pinion 98.

The rotation in one direction or the other of the threaded shaft 99 onto which is keyed the pinion 98, forces the grinding wheel carriage 52 to be displaced transversely (the said arrow F4).

To conclude, the determination of the signal 17 (position of the active surface of the grinding wheel, i.e. line 92 with respect to the nominal zero of the hole 1a, i.e. line 55) makes it possible to conduct the work cycle (jointly with the signals 32 and 9) with a direct check on the elastic strain of the wheel spindle whilst the said cycle is in progress and, furthermore, enables the nominal value of the diameter of the hole 1a to be reached with a preset taper.

The foregoing is achieved independently of the wear of the diamond and of the displacements of the axis of rotation for workpieces mounted on shoes.

What is claimed is:

1. An electronic control apparatus for internal grinders applied to a grinding machine where the workpiece is placed on slippers, and fitted with a hole diameter gauger, of the type in which the positions of both ends of a diameter are separately sensed by two symmetric, linear transducers, and with a measuring instrument acting along the axis of wheelhead unit traverses, referred to a trued position, the apparatus comprising means for deriving displacements from one workpiece to the next workpiece of the axis of rotation, caused by differences in their respective outer diameters from signals from said two linear transducers, said means for deriving comprising an analogic inverter, wherein the sign of the signal delivered by one of said transducers is reversed, an analogic adder wherein the sum is formed of said signal having a reversed sign and of the signal delivered by the other one of said transducers; means for obtaining from the hole diameter gaugings, from the traverses of grinding wheel and from the displacements of workpiece rotation axis, the trued position considered along the axis of feeds relative to a workpiece, and means for utilization of the measurements and of the trued position for controlling a machining cycle.

2. An electronic control apparatus according to claim 1, wherein the means for deriving the trued position relative to a workpiece comprise an additional analogic adder in which a sum is made of amount of wheel traverses, of shifting of workpiece rotation axis and output of a device by which an adjustable and memorizable signal is delivered; an analogic comparator in which output from said additional adder is compared with a pre-established value; a logical unit which, when given, pre-established conditions exist, enables passage from said comparator of a stop grinding wheel feed signal; a timer which is started simultaneously with the stopping of feed; and a device in which output from said additional adder is compared with gauging of hole diameter, said device effecting delivery of said adjustable and memorizable signal to allow, at the expiration of time adjusted on said timer, for the regulation of signal according to the indications of said comparator until output of said additional adder is made equal to gauging of hole diameter, keeping then this signal unchanged up to the next adjustment.

3. An electronic control apparatus according to claim 2, with the exception that measurement of shifting of workpiece rotation axis is left out.

4. An electronic control apparatus according to claim 2, wherein a comparator which is fitted between an outlet of said additional adder and said hole diameter gauging device, consists of a simple analogic comparator, while said device by which the adjustable and memorizable signal is delivered, consists of a clock, a bidirectional counter, a digital-analogic converter of the state of said counter, which outlet represents the adjustable and memorizable signal; logical means by which the counting direction of said counter is pre-set according to level of output of said analogic comparator, and by which counting is started at expiration of time set on said timer, and is stopped when a change occurs in the level of output of said analogic comparator.

5. An electronic control device according to claim 1, wherein the means for obtaining the trued position includes additionally to already stated analogic adder, a second analogic adder, in which the sum if formed of output from the first said adder, and the gauging of hole diameter, which sign is reversed by an expressly provided said analogic inverter; a first comparator, in which output of said second adder is compared with pre-established value to provide a first control signal which is to effect irreversible conversion from maximum feed speed of grinding wheel, to a lower speed; a second comparator in which output of said second adder is compared with a pre-established value to provide a second control signal by which feed is to be adjusted in such a manner as to keep output from said second adder about equal to the comparison value; a third comparator in which the gauging of hole diameter is compared with a pre-set value to provide a third control signal which is to effect irreversible conversion from a roughing step to a finishing step; and a fourth comparator in which output of said first adder is compared with a preset value in a finishing step to provide a fourth control signal which is to effect a change in direction of feed motion of said grinding wheel by its level, and a final, irreversible stopping of said motion by a change of its level.

6. In an electronic control apparatus for interal grinders applied to a grinding machine where a workpiece is to be placed on slippers and which includes gauging means for sensing positions of both ends of a diameter, the gauging means including two symmetric, linear transducers, and means responsive to output signals from the two transducers; the improvement wherein said means responsive to output signals comprise an analogic inverter responsive to an output signal from one of said transducers for inverting the signal; an analogic adder responsive to the signal from said inverter and an output signal from the other of said two transducers for producing a sum signal; means responsive to signals representative of hole diameter, grinding wheel traverses and displacement of workpiece rotation axis for producing a signal representative of position of a given point relative to an expected point of tangency between said wheel and a finished workpiece, and control means responsive to at least the sum signal and the signal representative of position for controlling the cycle of the grinding machine.

* * * * *